United States Patent [19]

Tassle et al.

[11] Patent Number: 4,714,923
[45] Date of Patent: Dec. 22, 1987

[54] METHOD AND APPARATUS FOR SHEDDING LOAD IN A COMMUNICATIONS CONTROLLER OF A DATA COMMUNICATIONS SYSTEM

[75] Inventors: C. R. V. Tassle, Hanover Park; Thomas A. Freeburg, Arlington Heights, both of Ill.

[73] Assignee: Motorola, Inc., Schaumburg, Ill.

[21] Appl. No.: 15,488

[22] Filed: Feb. 9, 1987

Related U.S. Application Data

[63] Continuation of Ser. No. 719,929, Apr. 4, 1985, abandoned, which is a continuation-in-part of Ser. No. 659,938, Oct. 12, 1984, Pat. No. 4,597,105, which is a continuation-in-part of Ser. No. 441,327, Nov. 12, 1982, Pat. No. 4,481,670.

[51] Int. Cl.$^4$ .............................................. H04Q 1/00
[52] U.S. Cl. .............................. 340/825.06; 340/825.5; 340/825.51
[58] Field of Search ............... 340/825.06, 825.44, 340/825.47, 825.48, 825.5, 825.52, 502; 364/200, 900; 331/1; 370/94, 58, 60; 371/33; 375/100

[56] References Cited

U.S. PATENT DOCUMENTS

| | | | |
|---|---|---|---|
| 4,332,027 | 5/1982 | Malcolm et al. | 370/94 |
| 4,543,540 | 9/1985 | Linder | 331/1 A |

*Primary Examiner*—Ulysses Weldon
*Attorney, Agent, or Firm*—Rolland R. Hackbart

[57] ABSTRACT

A data communications system covers a geographic area divided into a plurality of non-overlapping zones and includes a general communications controller (GCC), a plurality of channel communications modules (CCM) and associated transmitters and receivers, and a plurality of portable radios. Messages carrying alphanumeric information are communicated between the GCC and the portable radios by way of a radio channel. Each CCM takes a signal strength measurement every time it receives a message from a portable radio. The GCC includes a multi-tasking processor that executes tasks on a priority basis. Inbound messages are processed on a high priority basis and are ignored if the GCC is overloaded and the inbound message is of the type that will be reasserted. Thus, by shedding inbound messages that will be re-asserted, the GCC can accomodate peak message loads demanding 100% of its capacity without becoming unstable.

12 Claims, 13 Drawing Figures

METHOD AND APPARATUS FOR SHEDDING LOAD IN A COMMUNICATIONS CONTROLLER OF A DATA COMMUNICATIONS SYSTEM

RELATED APPLICATIONS

This is a continuation of application Ser. No. 719,929, filed Apr. 4, 1985, now abandoned, which is a continuation-in-part of copending U.S. patent application Ser. No. 659,938 filed Oct. 12, 1984 and now U.S. Pat. No. 4,597,105, which is a continuation-in-part of U.S. patent application Ser. No. 441,327 filed Nov. 12, 1982 and now U.S. Pat. No. 4,481,670 (both applications being incorporated herein by reference thereto).

BACKGROUND OF THE INVENTION

The present invention is generally related to communications systems and more particularly to an improved method and apparatus for substantially enhancing the stability of data communications systems subjected to peak loads demanding 100% of system capacity.

Prior art data communications systems must be operated at 30 to 50% of their capacity in order to accommodate peak expected loads. Furthermore, if the actual peak load demands 100% of system capacity, such prior art data communications systems will crash. Such catastrophic failures are not acceptable in multi-user data communications systems.

Prior art data communications systems typically must acknowledge an inbound message within a few seconds, or the inbound message will be re-asserted. As the system load increases it takes longer and longer to return the acknowledgement message. During peak loads, the acknowledge takes so long that the inbound messages are re-asserted before any acknowledgement messages are returned by the communications controller. Catastrophic regeneration is produced since more load is put on the communications controller, which in turn further increases the acknowledge response time. Thus, such prior art data communications systems become unstable and crash when subjected to inbound message loads demanding 100% of system capacity.

In some prior art data communications systems, a slow down message can be used to reduce the frequency of inbound messages. However, the necessity of sending such slow down messages to every message source both adds to the load and may cause the communications controller to become unstable and crash. Moreover, the use of slow down messages does not accommodate recurring short duration peak loads demanding 100% of system capacity. Other techniques limiting the number of input message buffers or buffer length are likewise inadequate since peak loads may demand 100% of system capacity while buffers are free, and ignoring further messages when buffers are full may result in the loss of inbound messages that will not be re-asserted.

OBJECTS AND SUMMARY OF THE INVENTION

Accordingly, it is an object of the present invention to provide an improved method and apparatus for controlling the input message load of a communications controller.

It is another object of the present invention to provide an improved method and apparatus for substantially enhancing the stability of a communications controller by controlling the input message load applied thereto.

Briefly described, the present invention encompasses a method for controlling the input message load of a multi-tasking data processor, such as a data communications controller. The input message load includes first type messages which are not re-asserted and second type messages which are re-asserted until acknowledged by the data processor. The novel method comprises the steps of periodically executing a task of saving the current time on a low priority basis; and executing on a high priority basis for each input message, an input task comprised of the steps of comparing the current time to the saved time, and ignoring the input message if it is a second type message and the difference between the current time and the saved time is greater than a predetermined time interval. Thus, by shedding input message load that will be re-asserted, the data processor can accommodate to peak message loads demanding 100% of its capacity without becoming unstable.

DETAILED DESCRIPTION OF THE PREFERRED EMBODIMENTS

Figure 1:
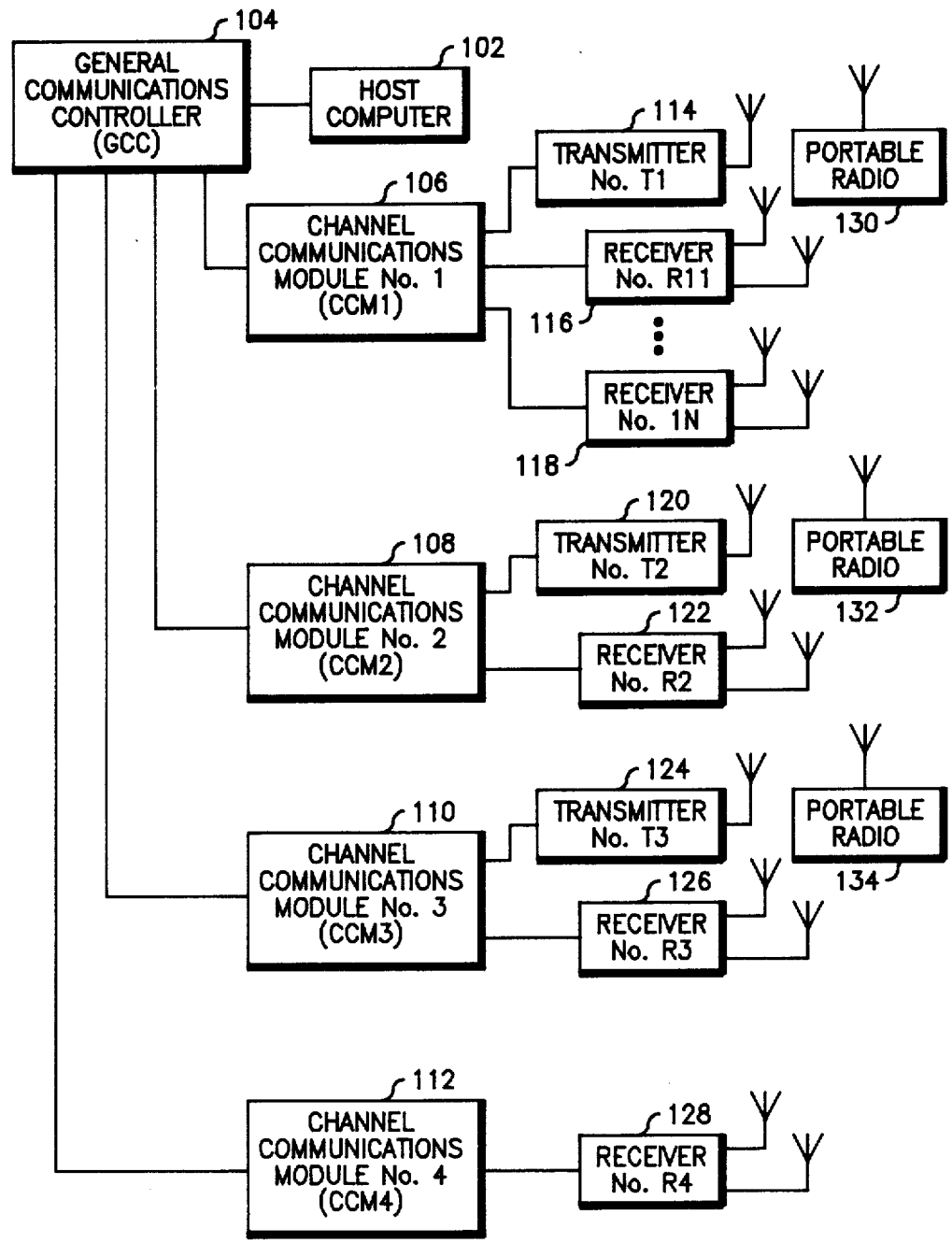
FIG. 1 is a block diagram of a data communications system that may advantageously utilize the present invention.

In FIG. 1, there is illustrated a data communications system that communicates message signals between a primary station, such as a general communications controller (GCC) 104, by way of a communications medium, such as a radio frequency (RF) communications channel, to a plurality of remote stations, such as mobile or porttable data radios 130, 132 and 134. Although described in the context of a data only communications system, both data signals and analog signals such as voice signals can be communicated over the RF communications channel to the portable data radios 130, 132 and 134. The data communications system covers a large geographical area which is divided into a plurality of cells or zones. Located throughout the geographical area are a number of channel communications modules (CCM) 106, 108, 110 and 112, which are each coupled to and control a number of base radios including RF signal transmitters 114, 120, and 124 and RF signal receivers 116, 118, 122, 126 and 128.

The RF communications channel is preferably comprised of first and second carrier signals which may be modulated with the message signals. Transmitters 114, 120 and 124 may be operative on the first carrier signal, while receivers 116, 118, 122, 126 and 128 may be operative on the second carrier signal of the radio communications channel. Each zone of the radio communications system is covered by an assigned one of the transmitters 114, 120 and 124 and by at least one of the receivers 116, 118, 122, 126 and 128. Transmitters 114, 120 and 124 and receivers 116, 118, 122, 126 and 128 may be any suitable commercially available transmitters and receivers such as those described in Motorola Instruction Manual 68P81013E65. CCM's 106, 108, 110 and 112 may be co-located with their corresponding transmitters and receivers or may be remotely located located and coupled to their corresponding transmitters and receivers by means of a suitable remote control system, such as, for example, the tone remote control system described in U.S. Pat. No. 3,577,080.

Portable radios 130, 132 and 134 may be either commercially available mobile radios of the type shown and described in Motorola instruction manual nos. 68P81039E25 and 68P81035C35 or commercially available hand-held portable radios of the type shown and described in U.S. Pat. Nos. 3,906,166, 3,962,553 and 4,486,624. Portable radios 130, 132 and 134 each include a transmitter operable on the second carrier signal and a receiver operable on the first carrier signal. The transmitter and receiver in portable radios 130, 132 and 134 may be any suitable commercially available conventional transmitter and receiver, such as, for example, the transmitter and receiver described in Motorola instruction manual no's. 68P81039E25 and 68P81014C65. These and the other Motorola Instruction Manuals referenced herein are available from the Service Publications Department of Motorola, Inc., 1301 East Algonquin Road, Schaumburg, Ill. or from Motorola C & E Parts, 1313 East Algonquin Road, Schaumburg, Ill.

GCC 104 of the data communications system in FIG. 1 may be coupled to a host computer 102 which may control a number of GCC's 104 that are located in different geographical areas, such as, for example, different cities. Thus, host computer 102 may gather data from, and dispatch data to, portable radios located in several different cities. GCC 104 may be coupled to host computer 102 and CCM's 106, 108, 110, and 112 by means of commercially available modems and associated dedicated telephone lines.

GCC 104 in FIG. 1 transmits message signals to and receives message signals from portable radios 130, 132 and 134. The message signals may include coded data packets which each may contain a binary preamble, a predetermined synchronization word and an information word containing a command, status or data. The format of the data packets may be any of a number of existing data formats, such as, for example, those described in U.S. Pat. Nos. 3,906,445, 4,156,867 and 4,354,252; in U.S. patent application Ser. No. 402,682 (now U.S. Pat. No. 4,590,473), entitled "Data Signalling System", filed July 28, 1982 and invented by Timothy M. Burke et al.; in U.S. patent application Ser. No. 512,801 (now U.S. Pat. No. 4,519,068), filed July 11, 1983, entitled "Method and Apparatus for Communicating Variable Length Messages Between a Primary Station and Remote Station of a Data Communications System" and invented by Jay Krebs et al., and in U.S. patent application Ser. No. 512,800 (now U.S. Pat. No. 4,517,669), filed July 11, 1983, entitled "Method and Apparatus for Coding Messages Communicated Between a Primary Station and Remote Stations of a Data Communications System" and invented by Thomas A. Freeburg et al. (all incorporated herein by reference thereto).

Figure 2:
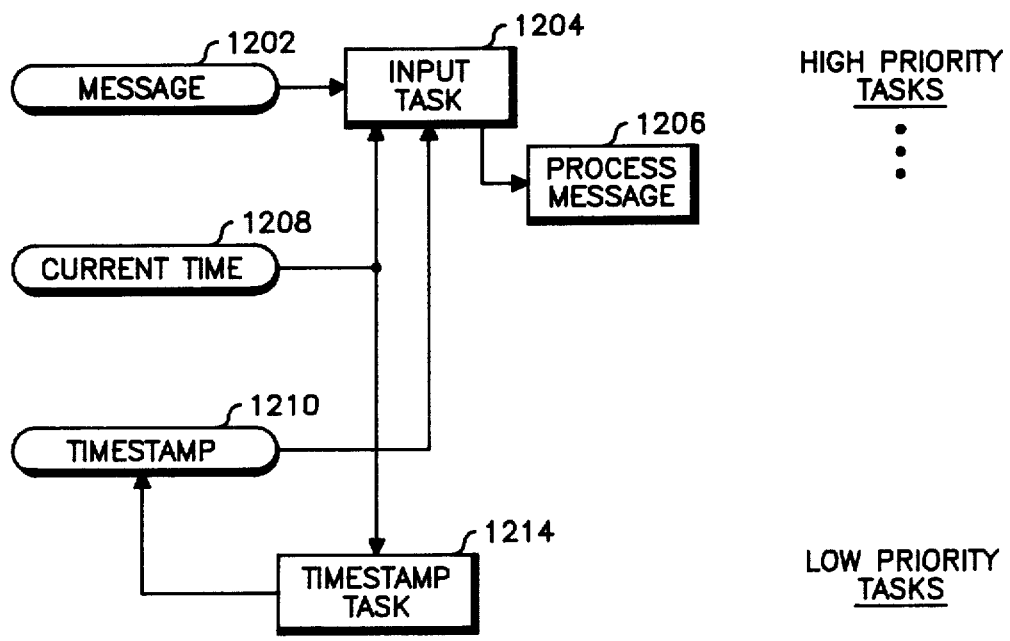
FIG. 2 is a block diagram of the tasks performed by the general communications controller in FIG. 1.

Referring next to FIG. 2, there is illustrated a block diagram of the tasks executed by GCC 104 in FIG. 1. All messages transmitted by GCC 104 to portable radios 130, 132 and 134 are acknowledged by an acknowledgement message from the selected portable radio. If the outbound message is not acknowledged by the selected portable radio, GCC 104 will retransmit the message a predetermined number of times. In other words processing time of GCC 104 is required until an outbound message has been acknowledged. Therefore, in order to minimize GCC processing time for outbound messages, inbound acknowledgement messages must be handled by GCC 104 on a high priority basis. In addition to acknowledgement messages, portable radios 130, 132 and 134 also originate data messages. A data message will be retransmitted a predetermined number of times by the portable radios until acknowledged by GCC 104. Since data messages are automatically retransmitted by the portable radios, loss of a particular inbound message is not catastrophic since it will be re-asserted.

On the other hand, peak input message loads demanding 100% of the GCC capacity my result in catastrophic failure if such inbound messages are and continue to be re-asserted before GCC 104 has acknowledged them. GCC 104 has no control over the timing, number of and frequency of re-assertion of inbound messages from portable radios 130, 132 and 134. Moreover, all CCMs receiving an inbound message forward multiple copies of the same inbound message to GCC 104 for processing. Thus, the message load of GCC 104 can build uncontrollably and cause GCC 104 to crash. By utilizing the present invention, such regenerative failures are eliminated and stability of the GCC 104 is greatly enhanced by controlling the input message load applied thereto. As illustrated in FIG. 2, GCC 104 is a multitasking processor that executes a plurality of tasks in priority order extending from high priority tasks such as the input task 1204 and process message task 1206, to low priority tasks such as the timestamp task 1214. Input task 1204 is a high priority task that is run by GCC 104 whenever an inbound message 1202 is received. According to the present invention, input task 1204 utilizes the curent time 1208 and the timestamp 1210 to determine if the inbound message is processed further in the process message task 1206 or is simply ignored. That is, if the timestamp 1210 has not been updated by the timestamp task 1214 for a predetermined time (DELTA), comparison of the current time 1208 to the timestamp 1214 will show that GCC 104 is overloaded and that data messages should be shed.

Figure 3:
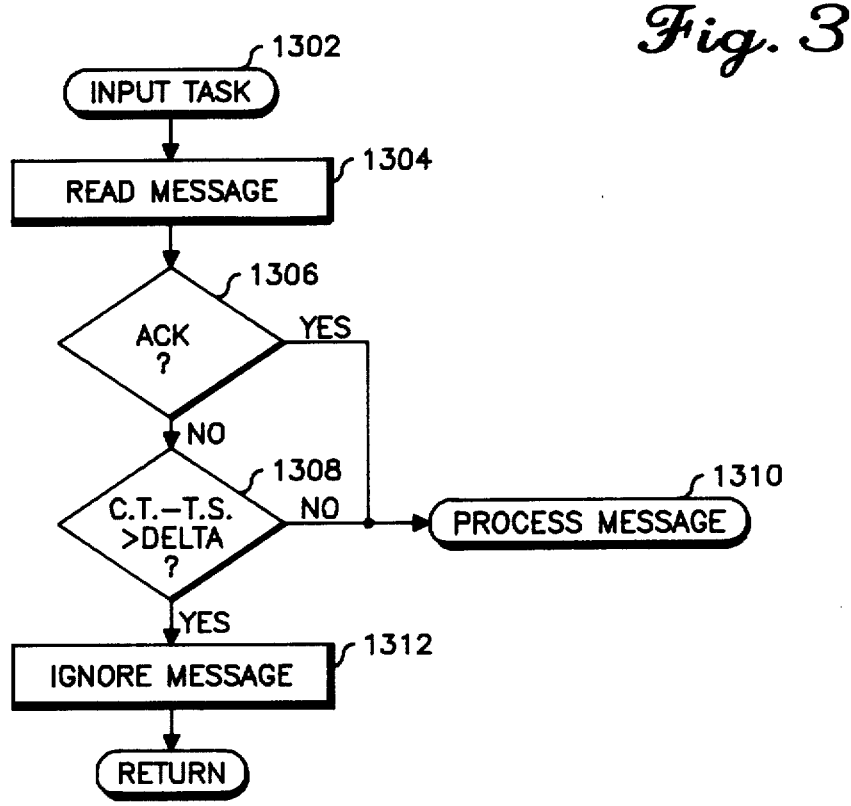
FIG. 3 is a flow chart used by the general communications controller in FIG. 1 to execute the input task.

In FIG. 3, there is illustrated a flow chart of the input task that is executed by GCC 104 when an inbound message is received. The input task is entered at block 1302 and program control proceeds to block 1304 where the inbound message is read. As explained hereinabove, there are two types of messages in the data communications system in FIG. 1. The first type of message is an acknowledgement message which is not re-asserted by the portable radios. The second type of message is a data message which is automatically reasserted a predetermined number of times by the portable radios. At decision block 1306, a check is made to determine if the inbound message is an acknowledgement message. If it is, YES branch is taken from decision block 1306 to the process message task at block 1310. During the process message task, GCC 104 executes the flow chart in FIG. 10 for processing the average signal strength measurements from CCMs receiving the same inbound message. If the inbound message is not an acknowledgement message, NO branch is taken from decision block 1306 to decision block 1308. At decision block 1308, the current time (C.T.) less the timestamp (T.S.) is compared to a predetermined time interval (DELTA) chosen to control the amount of feedback to be introduced. In a typical Poissonian characterized input message load, DELTA would be between two and three time the expected intra-arrival time of inbound messages. In the preferred embodiment of the present invention, DELTA is chosen to be eight seconds.

If C.T. - T.S. is not greater than DELTA, NO branch is taken from decision block 1308 to the process message task at block 1310. In this case, GCC 104 is not overloaded and the inbound message can be queued for processing. On the other hand, if C.T. - T.S. is greater than DELTA, YES branch is taken to block 1312 where futher processing the inbound message is terminated. Thus, when GCC 104 is overloaded, further inbound messages of the second type, which in the preferred embodiment are data messages, are ignored until loading of the GCC is reduced enough so that the timestamp task is executed. In most data communications systems, peak message loads are of rather short duration, such as, for example, one to two seconds, and typically tend to recur. Therefore, if GCC 104 catches up between peak message loads, the timestamp task may be executed and the timestamp is updated so that subsequently received data messages may be processed.

Figure 4:
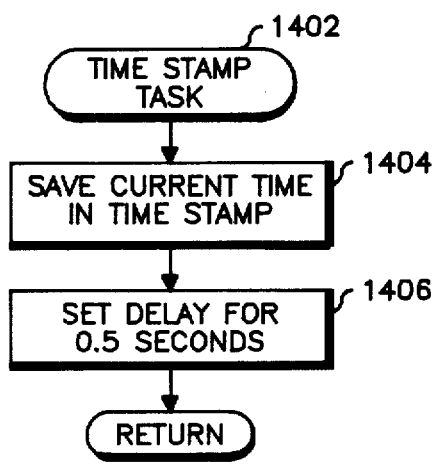
FIG. 4 is a flow chart used by the general communications controller in FIG. 1 to execute the timestamp task.

Referring to FIG. 4, there is illustrated a flow chart for the timestamp task that is periodically executed by GCC 104 on a low priority basis. The timestamp task is entered at block 1402 and at block 1404 the current time is read and stored in the timestamp. The current time may be produced by a separate integrated circuit or may be developed by GCC 104 by incrementing a current time variable in response to periodic interrupts. Then at block 1406, a delay, 0.015 seconds in the preferred embodiment, is set such that the timestamp task will not be queued for execution for at least another 0.5 seconds. Once that the 0.5 second delay times out, the timestamp task is again queued for execution by GCC 104 on a low priority basis.

Message signals are routed by GCC 104 to a selected CCM 106, 108, 110 and 112 for transmission by its corresponding transmitter. Since the message signals are not transmitted on all transmitters simultaneously, as in simulcast systems of the type described in U.S. Pat. No. 4,188 522 it is necessary that GCC 104 have a reasonably accurate determination of the location of each portable radio 130, 132 and 134 so that GCC 104 may select the transmitter 114, 120 or 124 which covers the zone in which a particular portable radio is located. The novel operation of the present data communication system enables GCC 104 to dynamically select the transmitter 114, 120 or 124 for transmitting a message signal to a selected portable radio 130, 132 or 134. According to another important feature of the present data communications system, two or more of the transmitters 114, 120 or 124 can be operated simultaneously for communicating with different portable radios located in different zones provided that transmissions from the two transmitters do not interfere with reception in the particular zones where the two portable radios are located. As a result, data throughput of the data communications system illustrated in FIG. 1 can be significantly increased by re-use of the RF communications channel. In other words, by taking advantage of re-use, a single RF communications channel can serve thousands of portable radios in a geographical area covering several states and their major cities.

Figure 5:
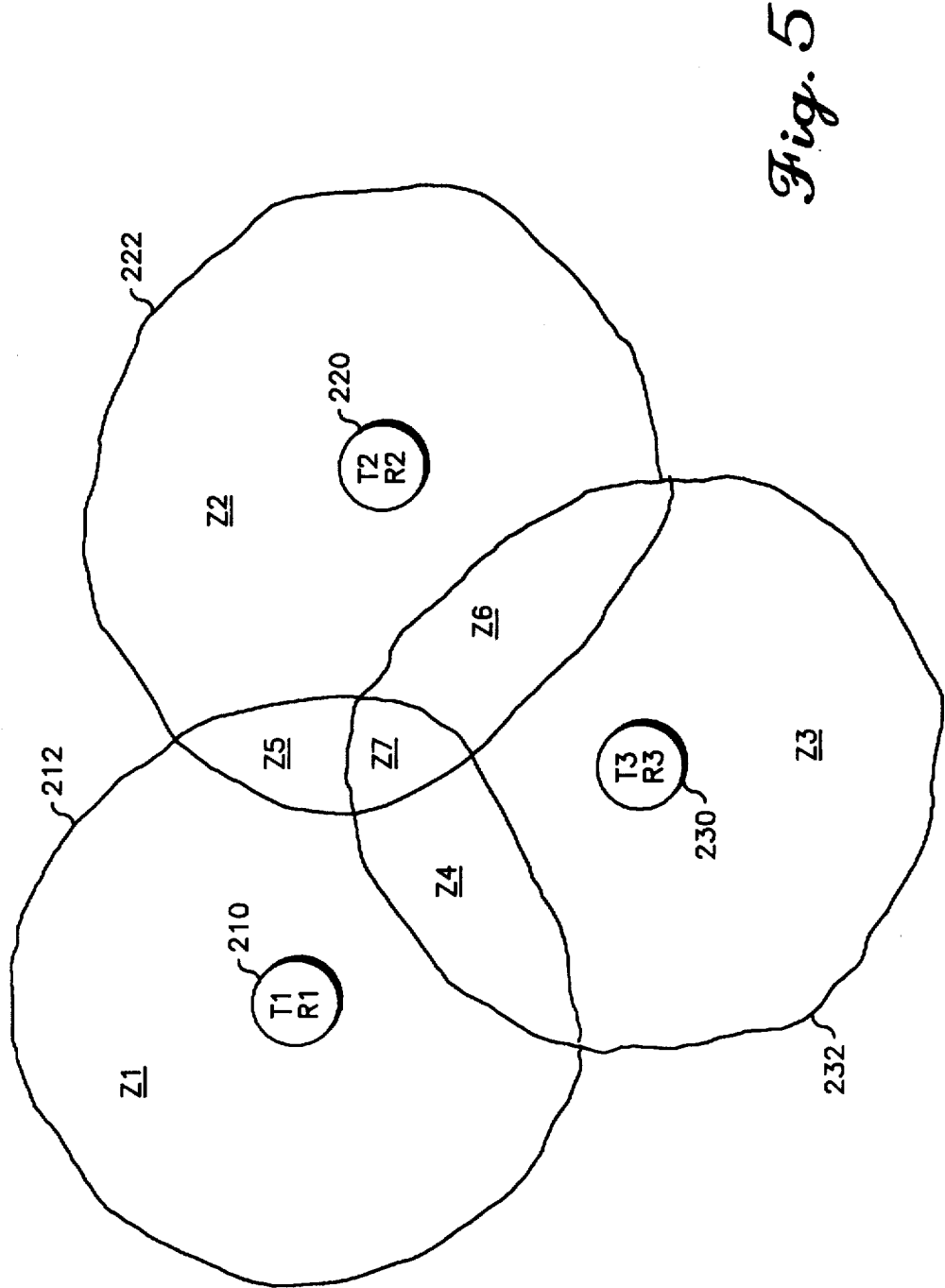
FIG. 5 is a diagram of a geographical area that is divided up into a number of zones.

Referring to FIG. 5, there is illustrated a geographical area of a data communications system that is divided into seven zones, Z1–Z7, and that includes three CCMs 210, 220 and 230 and corresponding transmitters and receivers. Transmitter T1 of CCM 210 has a coverage area within circle 212, transmitter T2 of CCM 220 within circle 222, and transmitter T3 of CCM 230 within circle 232. Each time a portable radio transmits, signal strength readings are taken by receivers R1, R2 and R3. These signal strength readings taken by receivers R1, R2 and R3 can be used to compute an adjusted signal strength for each zone Z1-Z7 by adjusting the measured signal strength for each receiver R1, R2 and R3 by corresponding predetermined factors associated with the particular zone and then combining the adjusted signal strengths. The predetermined factors used to compute the adjusted signal strength depend on a number of factors such as the terrain, the height and gain of the antennas, and the sensitivity of the receivers. In other words, the predetermined factors associated with each zone are empirically determined and depend upon the characteristics of the equipment and terrain in each data communications system. A detailed description of signal strength and zone selection matrices and examples thereof are provided the aforementioned U.S. Pat. No. 4,481,670.

Whenever transmitting a message signal to that particular portable radio, GCC 104 will first transmit the message signal on the carrier signal of the transmitter that covers the zone which had the largest adjusted signal strength for the last transmission from that portable radio. Both that zone and the transmitter covering it are stored in the memory of GCC 104. If the portable radio does not acknowledge the transmission of the message signal from GCC 104, GCC 104 may attempt one or more retransmissions of the message signal by means of that selected transmittter. If the retransmissions likewise are not acknowledged by the portable radio, GCC 104 may then transmit the message signal via the transmitter covering the zone which had the second largest adjusted signal strength for the last transmission from that portable radio. Again, if the portable radio does not acknowledge the transmission from GCC 104, GCC 104 may resend the message signal one or more times by means of that selected transmitter. If GCC 104 does not reach the selected portable radio by means of these two transmitters, GCC 104 may either select another transmitter covering that portable radios "home" zone, or initiate a polling sequence in which the selected portable radio is polled in every zone in the data communications system starting with the portable radio's "home" zone.

Next, the transmitter re-use feature of the present data communication system may be illustrated by the seven zone arrangement in FIG. 5. First of all, there is no transmitter interference for communications to portable radios located in zones Z1, Z2 or Z3. That is, transmitter T1, T2 and T3 can be operated simultaneously for communicating with portable radios in zones Z1, Z2 and Z3, respectively. However, for zone Z4, transmitter T3 must be off; for zone Z5 transmitter T1 must be off; for zone Z6 transmitter T2 must be off; and for zone Z7 transmitters T2 and T3 must be off. Using the foregoing interference criteria, transmitter re-use is possible for all zones except for zone Z7. For example, if the portable radio is located in zone Z4, transmitter T1 is used to communicate with that portable radio, and transmitter T2 can be simultaneously operated for communicating with portable radios in zone Z2. Similarly, while transmitter T3 is used for communicating with a portable radio in zone Z6, transmitter T2 must be off and transmitter T1 can be on. In this case, transmitter T1 could be on and communicating with a portable radio located in zone Z1. A detailed description of the transmitter selection and zone interference matrices and examples thereof are provided in the aforementioned U.S. Pat. No. 4,481,670.

Figure 6:
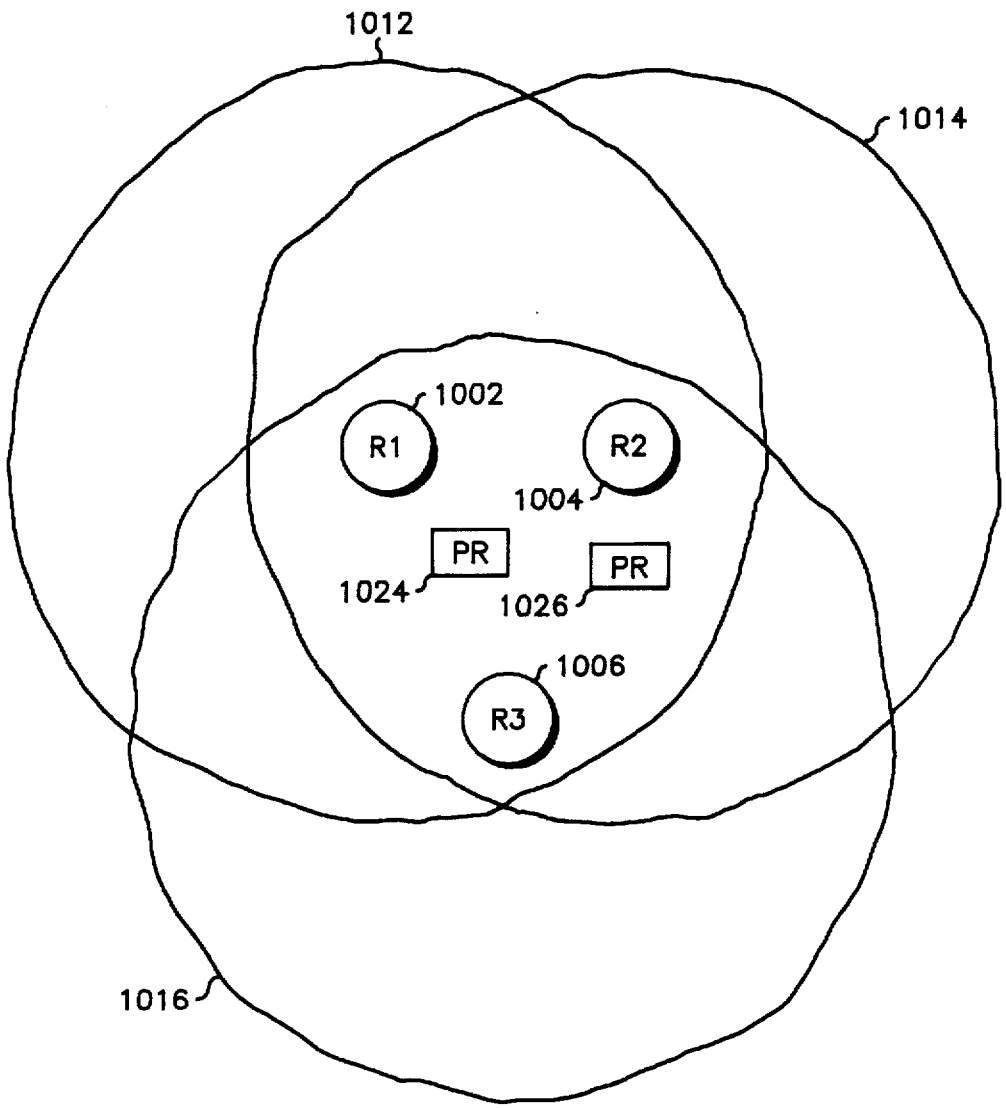
FIG. 6 is a diagram of a geographical area showing the coverage area for three receivers having overlapping coverage zones.

Next, the receiver coverage feature of the unique data communications system may be illustrated by a receiving system with a plurality of receivers having overlapping coverage areas such as shown in FIG. 6. A typical layout consists of three receivers 1002, 1004, and 1006, each with its coverage area 1012, 1014 and 1016 and an "intersection area" 1020, which is cross-hatched in FIG. 10. All receivers are tuned to the same radio channel receive frequency, and all portable radios contend with one another for that single radio channel. The single radio channel is reused by both portable radios and CCM transceivers whenever possible to enhance throughput. In other words, simultaneous transmissions from contending portable radios are highly probable since the same radio channel is reused throughout the geographical area (e.g. the entire United States).

If there are two portable radios 1024 and 1026 attempting to simultaneously transmit on the same frequency from different locations within the intersection area 1020, the probability of a specific portable terminal being successfully received at a specific receiver is the probability that the signal strength from the portable radio e.g. 1024 at a receiver e.g. 1002 exceeds the signal strength of the other portable radio 1026 at that receiver by an amount that is equal to or greater than the "capture ratio" (see U.S. application Ser. No. 603,399 filed Apr. 24, 1984 and invented by Stuart W. Thro, now abandoned in favor of U.S. patent application Ser. No. 847,100, filed Apr. 2, 1986).

Under the conditions described, it may be assumed that the signal strength of the example portable radio 1024 at a second receiver 1004 is a random variable that depends upon the random physical conditions (such as the location of the portable radio and intervening terrain) and is statistically independent of the signal strength of that portable radio at other receivers. Therefore, if the probability of portable radio 1024 being successfully received at receiver 1002 is P, then the probability of the same portable radio being successfully received at receiver 1004 is also P, and the joint probability $P_J$ of the portable radio being successfully received at least one of the receivers 1002 and 1004 is given by the well known formula for combining independent probabilities and is:

$$P_J = 1 - (1 - P)^2$$

Similarly, the joint probability $P_J$ of a portable radio being received by at least one of the three receivers 1002, 1004, and 1006 is $$P_J = 1 - (1 - P)^3.$$

According to a novel feature of the present data communications system, the coverage areas of receivers 1002, 1004 and 1006 are overlapped to the extent that the probability that a portable radio will be successfully received in the presence of an interfering transmission from another portable radio is at least a predetermined minimum P at each receiver. To show a numerical example, a typical value for P might be 0.85. This means that the three receiver situation improves the probability of success from 0.85 to 0.9966. As a result, data throughput has been greatly enhanced even though portable radios are simultaneously transmitting on a single shared radio channel.

Figure 7:
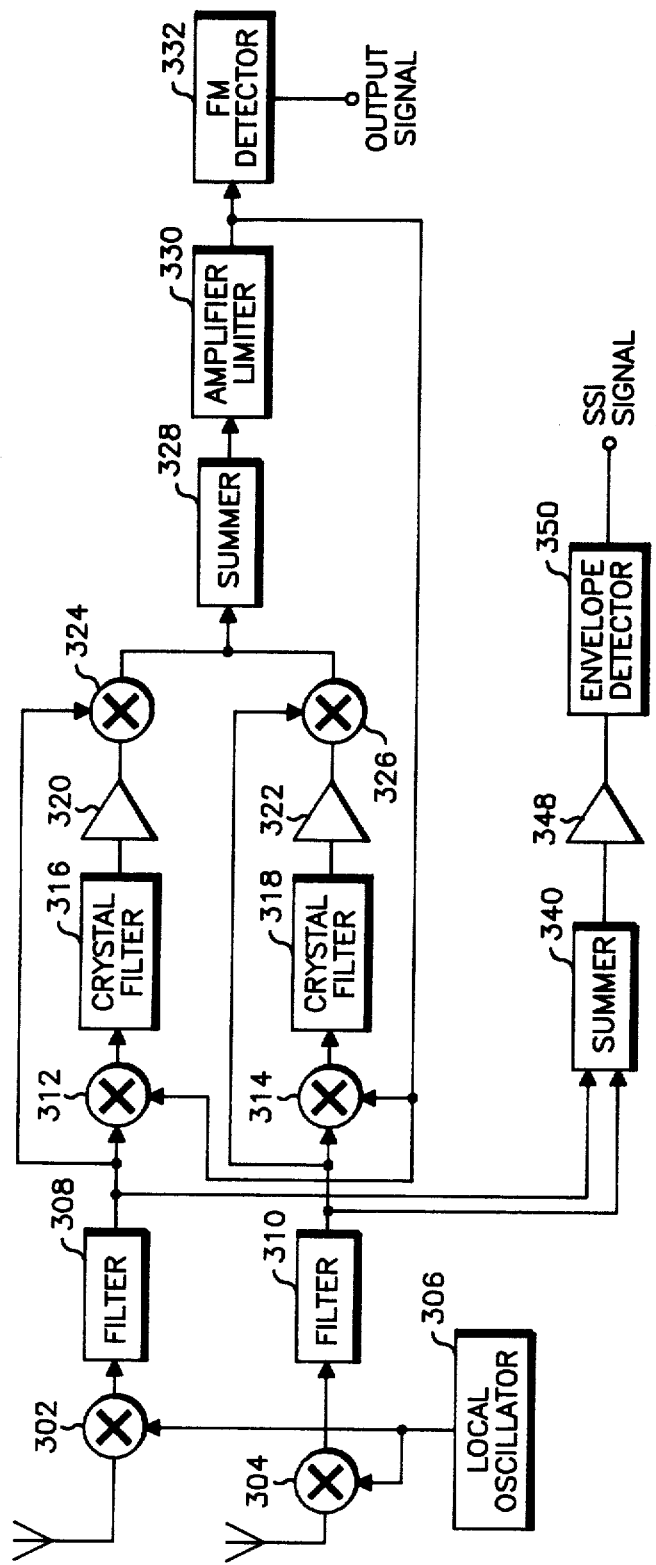
FIG. 7 is a block diagram of the circuitry in the receivers in FIG. 1.

Referring to FIG. 7, there is illustrated a detailed circuit diagram of the receivers 116, 118, 122, 126 and 128 associated with CCM's 106, 108, 110 and 112 in FIG. 1. Each receiver includes two antennas spaced at a predetermined distance from one another and a maximal ratio predetection diversity combiner 312, 314, 316, 318, 320, 322, 324, 326 and 328 for combining the signals received by each of the antennas. The space diversity provided by the two antennas is utilized to prevent degradation in communications which results when an antenna is located in an RF signal null. Rapid and deep RF signal nulls, called Rayleigh fading, are experienced in communications systems operating at RF signal frequencies in the new 800 to 900 mHz frequency range. The maximal ratio predetection diversity combiner cophases the RF signals from each antenna and linearly adds the cophased signals to provide a composite signal having components that are proportional to the square of the RF signal s from each antenna. Therefore, strong signals are emphasized much more than weak signals. In other words, communications are not adversely affected if a very weak signal is received by one antenna and a reasonably good signal is received by the other antenna.

In the diversity receiver in FIG. 7, the frequency of local oscillator 306 determines which radio channel to which the diversity receiver is tuned. The RF signal received by each antenna is combined by mixers 302 and 304 with the signal from local oscillator 208 to provide corresponding IF signals. The IF signal from mixers 302 and 304 is then applied to IF bandpass filters 308 and 310, respectively, which may be a monolithic bandpass filter of conventional design similar to that described in U.S. Pat. No. 3,716,808. The filtered IF signals from filters 308 and 310 are split and fed forward via two paths to mixers 312, 324 and 314, 326, respectively. First portions of the IF signals are applied to mixers 324 and 326, and second portions of the IF signals are applied to mixers 312 and 314 together with the composite IF signal which is fed back from amplifier 330. By feeding back the composite IF signal, the IF strip of the diversity receiver forms a closed feedback loop that is regenerative on noise. Thus, the randomly varying phase of the IF signals from filters 308 and 310 relative to the composite IF signal is added into the closed loop via mixers 312 and 314 and then substracted out at mixers 324 and 326, respectively. By this process, the random phase variations are removed from the If signals in relation to the composite IF signal. The result is that each of the IF signals is cophased to the composite IF signal.

The product signals from mixers 312 and 314 at the difference frequency are applied to filters 316 and 318, respectively, which each provide a variable phase shift. Filters 316 and 318 may be two-pole crystal filters. The signals from filters 316 and 318 are linearly amplified by amplifiers 320 and 322, respectively and applied to the second input of mixers 324 and 326, respectively. Mixers 324 and 326 multiply the signals from amplifiers 320 and 322, respectively, with the IF signals from filters 308 and 310, respectively, to provide product signals that are cophased with the composite IF signal. The product signals from mixers 324 and 326 are both cophased and proportional to the square of the level of the IF signals from filters 308 and 310, respectively. The product signals from the mixers 324 and 326 are linearly added by summer 328 to form one composite IF signal. The composite IF signal may be coupled via amplifier 330 to a conventional FM detector 332 which has an output signal providing demodulated message signals. The output signal of FM detector 332 is coupled to its corresponding CCM 106, 108, 110 or 112 in FIG. 1. Further details of the circuitry in the diversity receiver in FIG. 3 are illustrated and described in U.S. Pat. No. 4,369,520 and in U.S. patent application Ser. No. 84,980 filed Oct. 15, 1979 (which was abandoned in favor of Ser. No. 268,613 filed June 1, 1981, which was abandoned in favor of Ser. No. 493,802 filed May 12, 1983, which was abandoned in favor of Ser No. 580,775 filed Feb. 21, 1984 and now U.S. Pat. No. 4,519,096), entitled "Large Dynamic Range multiplier for a Maximal Ratio Diversity Combiner", and invented by Frank J. Cerny, Jr. (all incorporated herein by reference thereto).

FIG. 7 also illustrates the circuitry 340, 348 and 350 comprising the signal strength detector that is located in the receivers. Summer 340 is coupled to the signals from filters 308 and 310 and provides a composite signal which is coupled to amplifier 348. The output of amplifier 348 is coupled to envelope detector 350 which provides an SSI signal that is proportional to the maxima of the composite signal from amplifier 348. A separate amplifier 348 and envelope detector 350 can be provided for each of the signals from filters 308 and 310 if it is desired to measure each separately. The SSI signal from envelope detector 350 is coupled to its corresponding CCM 106, 108, 110 or 112 in FIG. 1, where it is digitized. Many other types of commercially available signal strength detecting circuitry can be utilized in place of summer 340, amplifier 348, and envelope detector 350.

Figure 8:
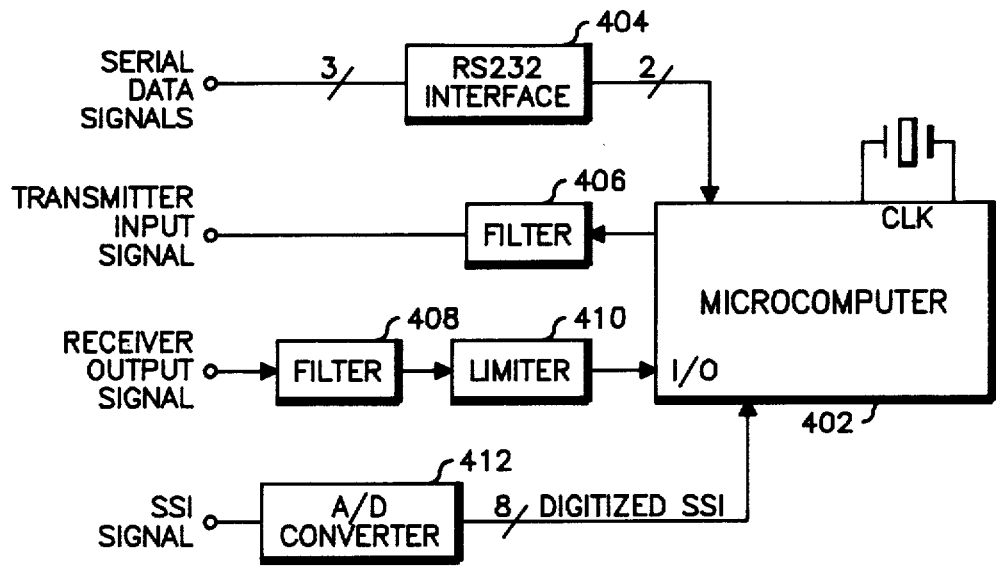
FIG. 8 is in a block diagram of the circuitry in the channel communications modules in FIG. 1.

Referring to FIG. 8, there is illustrated a block diagram of the circuitry in CCM's 106, 108, 110 and 112 in FIG. 1. Each CCM includes a microcomputer 402 having a memory with stored program therein for communicating with GCC 104 and portable radios 130, 132 and 134 in FIG. 1. Microcomputer 402 can be any suitable commercially available microcomputer such as, for example the Motorola type MC6800, MC6801 or MC68000 microprocessor, or those microprocessors described in U.S. Pat. Nos. 4,030,079 and 4,266,270.

Microcomputer 402 is coupled to RS232 interface 404 which may be coupled by a modem to a dedicated telephone line from GCC 104 in FIG. 1. Message signals received by microcomputer 402 from the GCC may be coupled in to filter 406 and thereafter applied to its corresponding transmitter. The message signals may be coded according to frequency-shift keying, phase-shift keying or any other suitable existing encoding scheme. Suitable message signal coding schemes are described in the aforementioned U.S. Pat Nos. 3,906,445, 4,156,867 and 4,354,252 and patent applications Ser. Nos. 402,682, 512,800 and 512,801. Message signals received from portable radios by the CCM's receiver are coupled to filter 408 and thereafter to limiter 410 which converts the analog signals into a non-return-to-zero binary signal. The output of limiter 410 is applied to an input port of microcomputer 402.

Microcomputer 402 also takes signal strength readings while it is receiving message signals. The SSI signal from its corresponding receiver is coupled to A/D converter 412, which may continuously convert the analog SSI signal to a digitized SSI signal. The digitized SSI signal from A/D converter 412 is applied to an input port of microcomputer 402. Several A/D conversions are performed while a message signal is being received. The digitized SSI signals for the several conversions are averaged by microcomputer 402. The average SSI signal is appended to the received message signal which is sent by microcomputer 404 via RS232 interface 404 to GCC 104 in FIG. 1.

Figure 9:
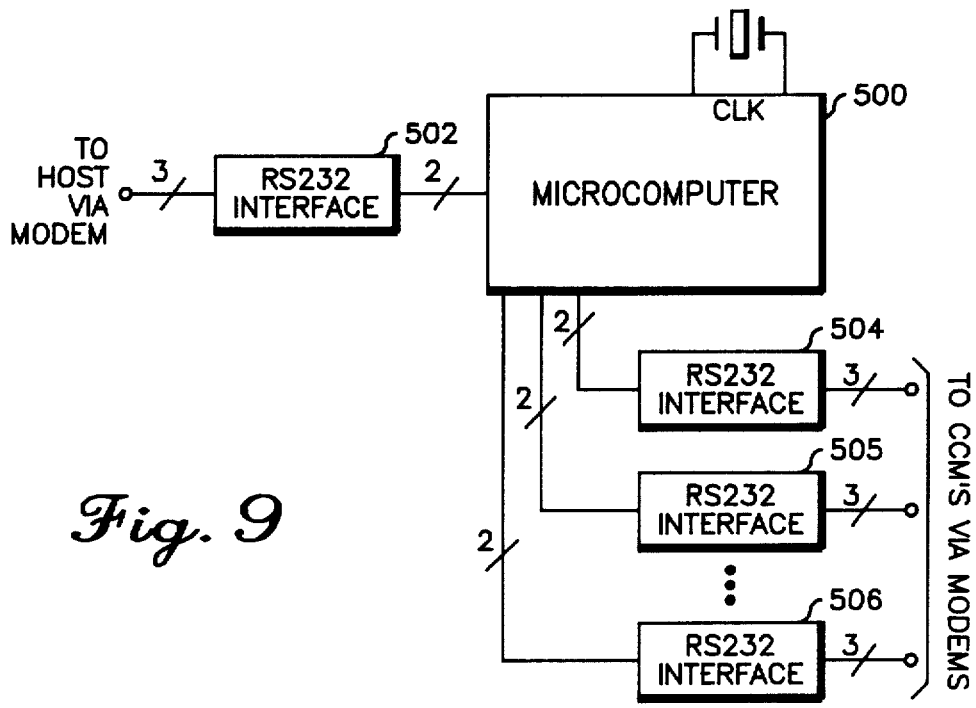
FIG. 9 is a block diagram of the circuitry in the general communications controller in FIG. 1.

Referring to FIG. 9, there is illustrated a block diagram of the circuitry in the general communications controller 104 in FIG. 1. The GCC includes a microcomputer 500 having a memory with a stored program for communicating with CCM's 106, 108, 110 and 112 in FIG. 1. Microcomputer 500 is coupled to RS232 interfaces 504, 505 and 506 which may be coupled by modems to dedicated telephone lines from each CCM. Microcomputer 500 is also coupled to RS232 interface 502 which may be coupled to a dedicated telephone line from host computer 102 in FIG. 1. Information in message signals received from portable radios by way of CCM's 106, 108, 110 and 112 is forwarded by microcomputer 500 to host computer 102. Conversely, information to be sent to portable radios from host computer 102 is transmitted to microcomputer 500 and incorporated into message signals transmitted to designated portable radios. Microcomputer 500 receives signal strength information from each of the CCM's whenever a portable radio transmits a message signal and processes the signal strength information to determine the zone in which that portable radio is presently located.

Microcomputer 500 stores for each portable radio the zone having the largest adjusted signal strength for the last transmission, the zone having the second largest adjusted signal strength for the last transmission, the "home" zone assigned to that portable radio, and the last zone used for communications with that portable radio. For subsequent transmissions of message signals to a portable radio, the GCC accesses the zone location information for that portable radio and selects a transmitter for transmitting a message signal in the zone in which the portable radio is most likely located. Microcomputer 500 also keeps track of which transmitters are in use and which transmitters interfere with communications in a particular zone. Thus, when transmitting a message signal in the zone where a selected portable radio is located, microcomputer 500 inhibits the use of other transmitters which would interfere with communications in that zone. If transmission of a message signal to a portable radio would interefere with a transmission already under way, microcomputer 500 queues that message signal for transmission when the interfering transmitter has completed its transmission. Microcomputer 500 can be any suitable commercially available microcomputer, such as, for example, a Motorola type MC6800, MC6801 or MC68000 microprocessor, or those microprocessors desctibed in U.S. Pat. Nos. 4,030,079 and 4,266,Z70.

Figure 12:
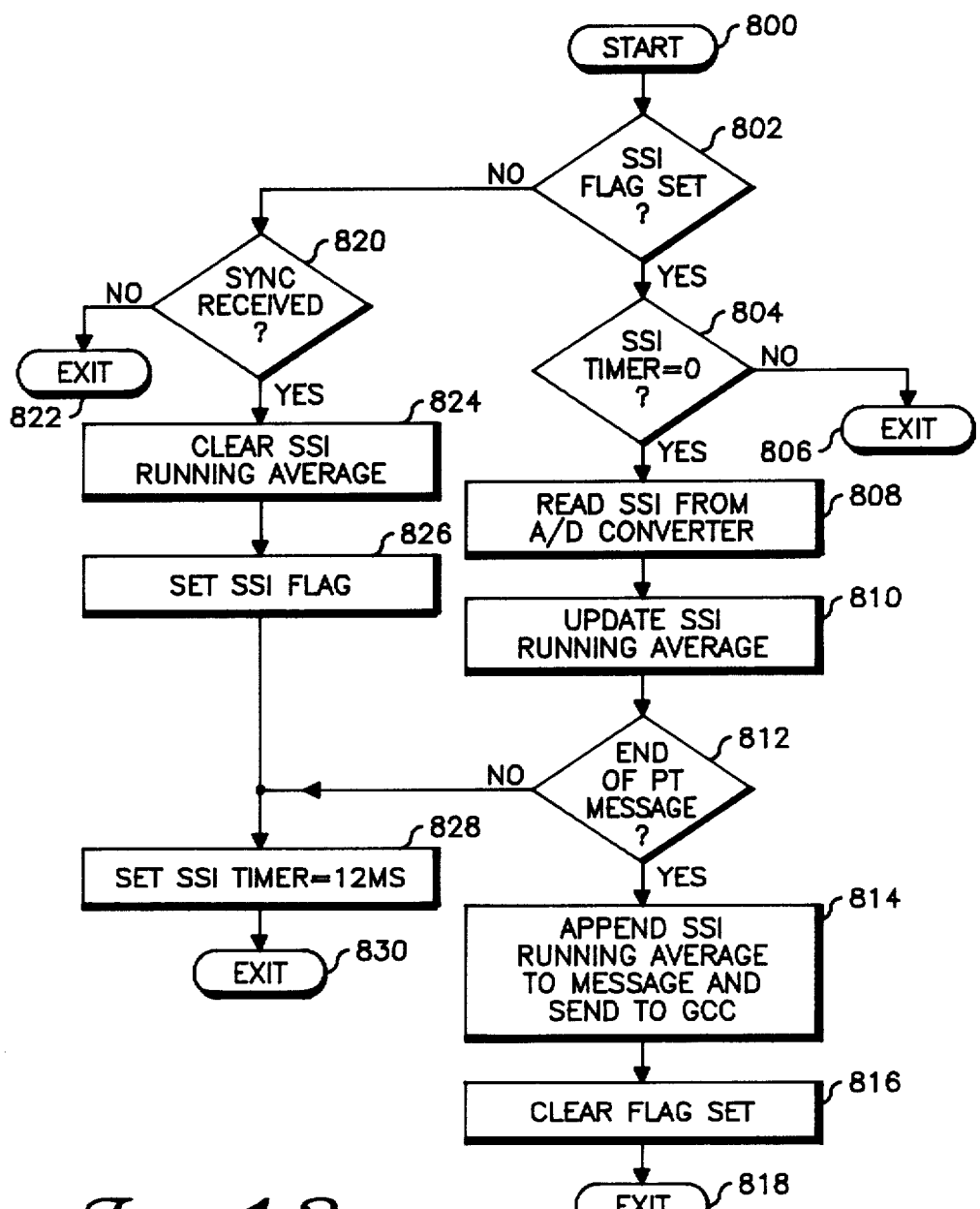
FIG. 12 is a flow chart used by the channel communications module for measuring the signal strength of signals transmitted by the portable radios in FIG. 1.

Referring next to FIG. 12, there is illustrated a flow chart including the process steps used by CCM's 106, 108, 110 and 112 in FIG. 1 for measuring the signal strength of RF signals transmitted by portable radios. The flow chart in FIG. 12 provides a detailed description of the process steps required for execution by microcomputer 402 in FIG. 8. The coding of the process steps of the flow chart in FIG. 12 into the instructions of a suitable commercially available microcomputer is a mere mechanical step for a routineer skilled in the art.

The process steps of the flow chart in FIG. 12 are designed to take two signal strength measurements for each data packet in a message signal received from a portable radio. For example, if there are four data packets in a message signal, eight signal strength measurements are taken and averaged. All CCM's 106, 108, 110 and 112 in FIG. 1 receiving the same message signal from a portable radio are likewise taking two signal strength measurements per data packet and appending the average signal strength to the message signal that is routed to the GCC. Therefore, within a short period of time, the GCC will be receiving several different average signal strength measurements from the CCM's that receive the same message signal from a portable radio. A detailed description of the blocks of the flow chart in FIG. 12 is provided in the aforementioned U.S. Pat. No. 4,481,670.

Figure 10:
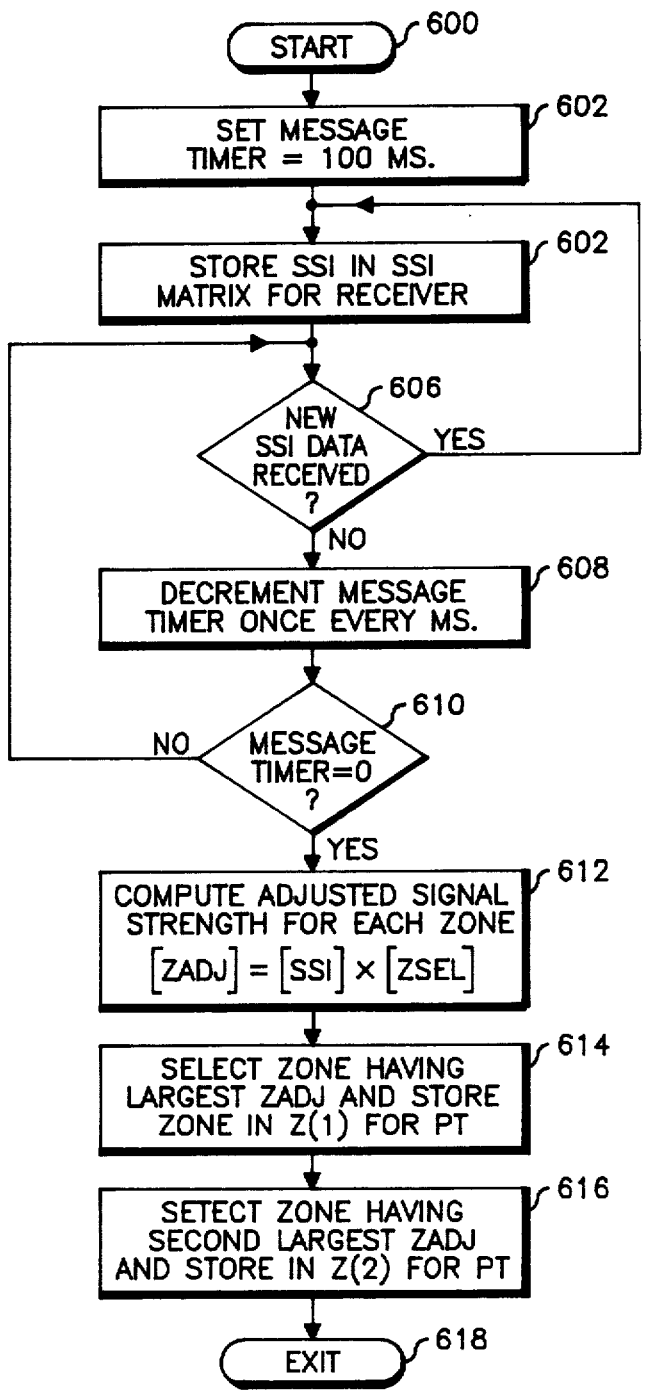
FIG. 10 is a flow chart used by the general communications controller for processing signal strength data received from the channel communications modules in FIG. 1.

Referring to FIG. 10, there is illustrated a flow chart used by GCC 104 for processing the average signal strength measurements received from each of the CCM's 106, 108, 110 and 112 in FIG. 1. The flow chart in FIG. 10 is entered at start block 600 whenever a message signal together with an average signal strength measurement is received from a CCM. At block 602 a message timer is set to one-hundred milliseconds to provide a time interval during which the same message signal is received by other CCM's and sent together with an average signal strength measurement to the GCC. All CCM's should receive, if at all, the same message signal at approximately the same time. The one-hundred millisecond message time interval is utilized to allow for CCM processing and transmission delays. Assuming that microcomputer 500 in FIG. 9 is interrupted once every millisecond, the message timer may be decremented in response to each interrupt.

At block 604 in FIG. 10, the average signal strength measurement received from each CCM with a message signal is entered into the SSI matrix in the position for the receiver that took the measurement. Next at block 612 in FIG. 10, an adjusted signal strength is computed for each zone using the newly received average signal strength measurements that have been entered into the SSI matrix and the predetermined factors previously entered into the ZSEL matrix. The resulting ZADJ matrix has one adjusted signal strength for each zone in the data communications system. Since some of the zones may be in different cities, some of the adjusted signal strengths may be zero. For the zone configuration in FIG. 9, it is possible that transmissions from a portable radio will be received by all three receivers R1, R2 and R3, producing an adjusted signal strength for all seven zones Z1–Z7.

Next, at block 614 in FIG. 10, the zone having the largest adjusted signal strength in the ZADJ matrix computed in block 612 is selected and stored in zone location Z(1) for the portable radio whose transmitted message signal was received by each of the CCM's. The number of CCM's receiving a message signal and making a signal strength measurement for a portable radio will vary depending both on the location of the portable radio and the terrain and location of receivers in the geographical area of the data communications system. In other words, depending on the location of a portable radio, as few as one and potentially all of the CCM receivers may receive the same message signal from a portable radio.

Next, at block 616, the zone having the second largest adjusted signal strength in the ZADJ matrix is selected and stored in zone location Z(2) for the particular portable radio. Zone locations Z(1) and Z(2) are the most likely zones in which that portable radio is located. Every time the portable radio transmits a message signal, new signal strength measurements are taken and the zones stored in zone locations Z(1) and Z(2) are updated. Thus, the location of each portable radio is updated every time that portable radio transmits a message signal using the average signal strength measurement taken by all of the CCM receivers that receive its message signal. Since the signal strength measurements from all CCM receivers receiving the same message signal are used, a reasonably accurate determination of the portable radio's location can be made. To insure that location information does not become stale, GCC in FIG. 1 can initiate a short where-are-you message signal for those portable radios that have been inactive for a relatively long period of time.

Figure 11:
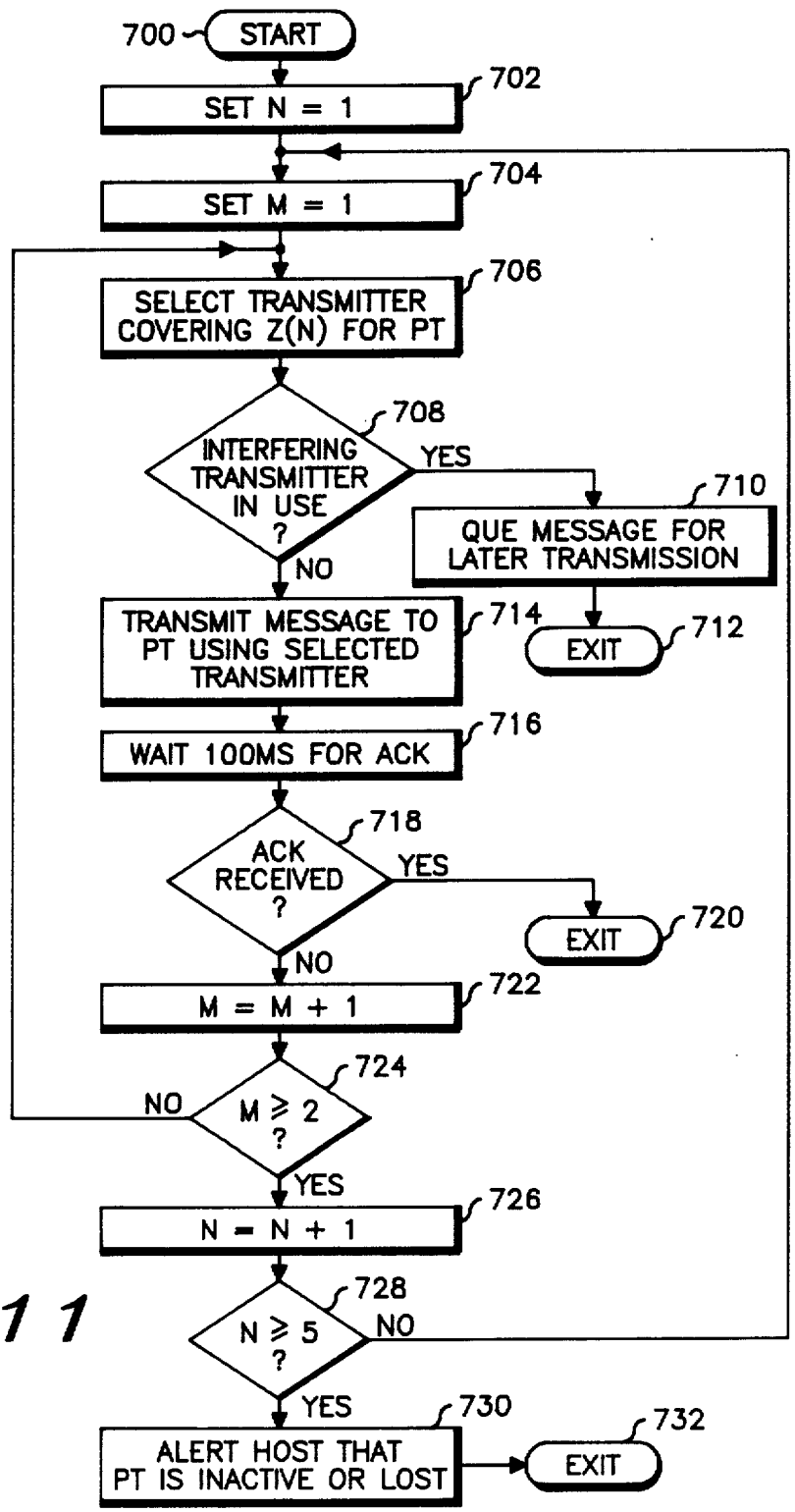
FIG. 11 is a flow chart used by the general communications controller for selecting a transmitter on which data signals are transmitted to a selected portable radio in FIG. 1.

Whenever it is desired to transmit a message signal from GCC 104 in FIG. 1 to a selected portable radio, the flow chart in FIG. 11 is utilized by the GCC for selecting the CCM transmitter covering the zone in which the selected portable radio is most likely to be located. A detailed description of the flow chart in FIG. 11 and the process of transmitter selection is provided in the aforementioned U.S. Pat. No. 4,481,670.

The flow charts in FIGS. 2, 3, 4, 10 and 11 provide a detailed description of the process steps used by GCC microcomputer 500 in FIG. 9 for processing inbound messages and communicating outbound messages to portable radios. The coding of the process steps of the flow charts in FIGS. 2, 3, 4, 10 and 11 into the instructions of a suitable commercially available microcomputer is a mere mechanical step for a routineer skilled in the art. By way of analogy to an electrical circuit diagram, the flow charts in FIGS. 2, 3, 4, 10, 11 and 12 are equivalent to a detailed schematic for an electrical circuit where provision of the exact part values for the electrical components in the electrical schematic corresponds to provision of microcomputer instructions for blocks in the flow charts.

Figure 13:
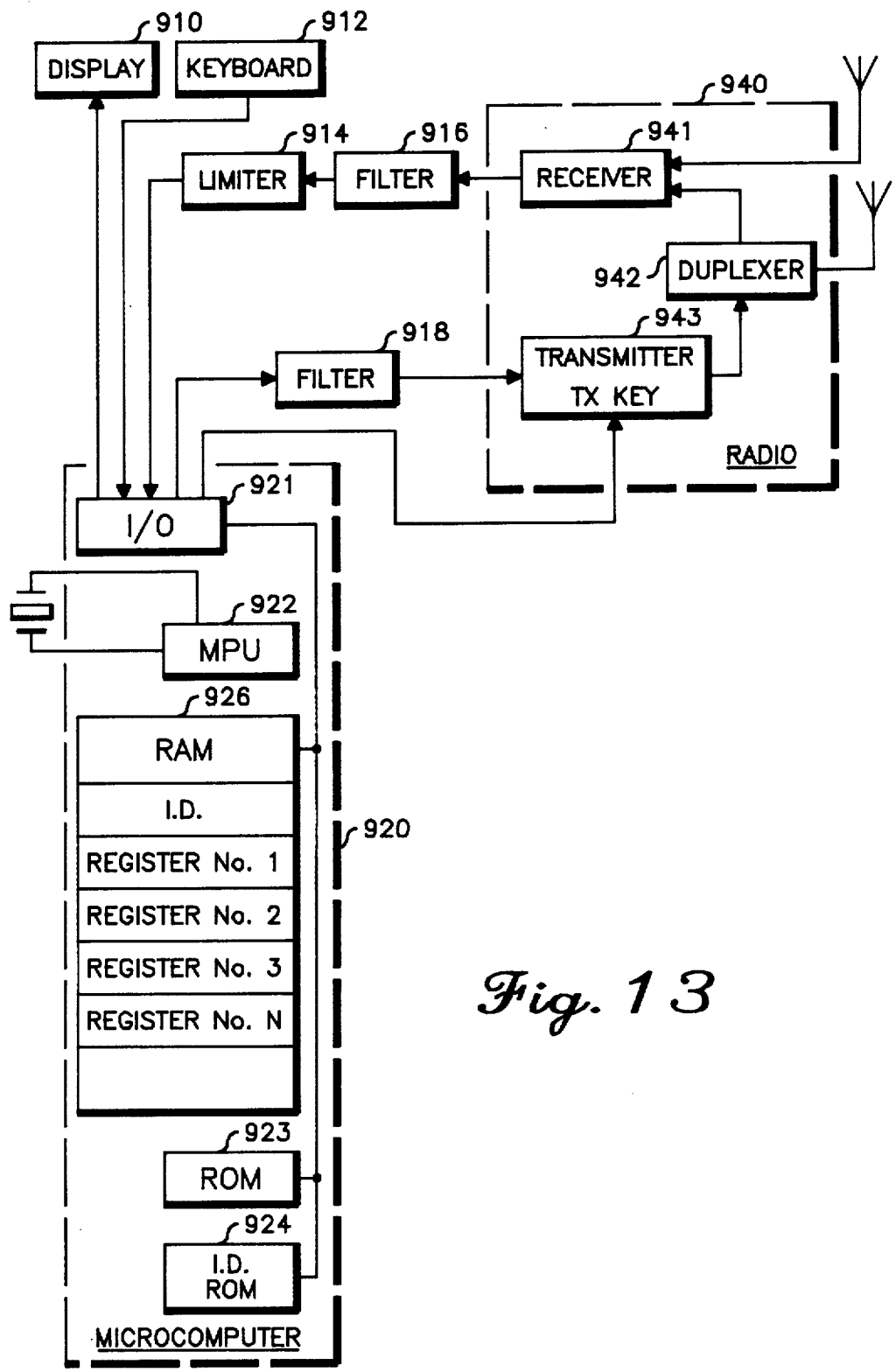
FIG. 13 is a block diagram of the circuitry in the portable radios in FIG. 1.

Referring to FIG. 13, there is illustrated a block diagram of the circuitry in portable radios 130, 132 and 134 in FIG. 1. Each portable radio includes a radio transceiver 940, a microcomputer 920, an alphanumeric display 910, and a keyboard 912. Alphanumeric display 910 may be any commercially available display, such as an LCD display or gas discharge display, that provides for the display of one or more lines of alphanumeric information. Display 910 is controlled by I/O device 921 of microcomputer 920. Keyboard 912 may be any commercially available keyboard having both numeric and alphanumeric keys. Keyboard 912 is coupled to I/O device 912 of microcomputer 920, which senses activation of its various keys.

Radio transceiver 940 in FIG. 13 may be any suitable commercially available transceiver, such as that described in the aforementioned Motorola instruction manual nos. 68P81039E25, 68P81035C35 or 68P81014C65. Radio transceiver 940 includes two antennas spaced at a predetermined distance from one another for providing receiver diversity. Receiver 941 is coupled directly to one antenna and coupled by duplexer 942 to the other antenna. Duplexer 942 may be any suitable commercially available duplexer, such as that described in U.S. Pat. No. 3,728,731. Receiver 941 may include suitable commercially available circuits for selecting between the two antennas, such as, for example, the antenna selection circuitry in the aforementioned Motorola instruction manual no. 68P81039E25. Receiver 941 demodulates message signals transmitted from the CCM transmitters. The demodulated message signals are filtered by filter 916 and limited by limiter 914 and thereafter applied to I/O device 921 of microcomputer 920. Message signals from I/O device 921 of microcomputer 920 are applied to filter 918 and thereafter to transmitter 943 for transmission to CCM receivers. Transmitter 943 is turned on in response to the TX key signal from I/O device 921 of microcomputer 920. The output of transmitter 943 is coupled to one of the radio transceiver antennas by way of duplexer 942.

Microcomputer 920 in FIG. 13 includes I/O devices 921, microprocessor (MPU) 922, random-access memory (RAM) 926, read-only memory (ROM) 923, and I.D. ROM 924. MPU 922 may be any suitable commercially available microprocessor, such as, for example, the Motorola Type MC6800, MC6801 or MC68000 microprocessors, or those microprocessors described in U.S. Pat. Nos. 4,030,079 and 4,266,270. Similarly, I/O device 921, ROM 926, ROM 923 and I.D. ROM 924 may be any commercially available devices that are suitable for operation with the type of microprocessor selectec for MPU 922. I.D. ROM 924 is a removable device that includes a specific identification code or address that is assigned to a portable radio. ROM 923 stores the control program that is executed by MPU 922 for communicating message signals and acknowledgement message signals to GCC 104 in FIG. 1. RAM 926 includes both a scratch pad area used by MPU 922 during execution of the control program stored in ROM 923 and a number of register locations allocated for storing the identification code read in by MPU 922 from I. D. ROM 924, information displayed by display 910, information entered from keyboard 912, and other status information. The contents of specific registers in RAM 926 may be loaded from message signals. received from GCC 104 in FIG. 1 or may be included in message signals sent by MPU 922 to the GCC. The formatting of register information into message signals may be accomplished as described in the aforementioned U.S. patent applications, Ser. Nos. 402,682 (which application also includes a listing of suitable control program), 512,800 and 512,801.

The portable radio illustrated in FIG. 13 may be either a mobile radio that is installed in a vehicle or a portable radio that is small enough to be hand-carried from place to place (See the aforementioned Motorola instruction manual numbers 68P81014C65 and 68P81035C35). Although the portable radio in FIG. 13 is primarily adapted to transmit and receive message signals including alphanumeric information, the portable radio may also provide voice communications by means of a speaker connected to the output of receiver 941 and a microphone connected to the input of transmitter 943. A portable radio adapted to communicate both alphanumeric information and voice signals is described in U.S. Pat. No. 4,430,742.

In summary, a unique method and apparatus has been described which substantially enhances the stability of a communications controller by controlling the input message load applied thereto. A low priority task periodically saves a timestamp which is used by the input task to determine when to shed inbound messages. Inbound messages that are re-asserted if not acknowledged are shed to prevent catastrophic failure of the communications controller. The novel load control method can be advantageously utilized in any suitable data communications system where inbound messages are re-asserted if not acknowledged.

We claim:

1. A method of controlling messages applied by remote stations to multi-tasking data processing means, the message including first type messages which are not re-asserted and second type messages which are re-asserted until ackowledged by the data processing means, said data processing means including means for generating the current time and at least two receiving means each receiving a copy of the messages from a remote station, said method comprising the steps of:

periodically executing on a low priority basis a timestamp task of saving the value of the current time;

receiving at least two copies of each message from a remote station; and executing on a high priority basis for each received message, an input task comprised of the steps of identifying the received message as a first type message or a second type message; comparing the value of the current time to the saved value; and ignoring the received messasge if it is identified as a second type message and the difference between the value of the current time and the saved value is greater than a predetermined amount.

2. The method according to claim 1, wherein said ignoring step of said input task further includes the step of processing the received message if it is identified as a first type message.

3. The method according to claim 1, wherein said ignoring step of said input task further includes the step of processing the received message if it is identified as a second type message and the difference between the value of the current time and the saved value is not greater than the predetermined amount.

4. A method of controlling messages applied by remote stations to multi-tasking communications control means of a data communications system, the messages including acknowledgement messages which are not re-asserted and data messages which are re-asserted by the remote stations until acknowledged by the communications control means, said communications control means including means for generating the current time and at least two receiving means each receiving a copy of the messages from a remote station, said method comprising the steps of:

periodically executing on a low priority basis a timestamp task of saving the value of the current time;

receiving at least two copies of each message from a remote station; and executing on a high priority basis for each received message, an input task comprised of the steps of identifying the received message as an acknowledgement message or a data message; comparing the value of the current time to the saved value; and ignoring the received message if it is identified as a data message and the difference between the value of the current time and the saved value is greater than a predetermined amount.

5. The method according to claim 4, wherein said ignoring step of said input task further includes the step of processsing the received message if it is identified as an acknowledgement message.

6. The method according to claim 4, wherein said ignoring step of said input task further includes the step of processing the received message if it is identified as a data message and the difference between the value of the current time and the saved value is not greater than the predetermined amount.

7. A method of controlling messages transmitted by data radios to multi-tasking comunications control means of a data radio communications system, said communications control means coupled to a plurality of base radios for receiving via a radio channel copies of each message transmitted by a data radio, the messages including acknowledgement messages which are not re-asserted and data messages which are re-asserted by the data radios until acknowledged by the communications control means, said communications control means further including means for generating the current time, said method comprising the steps of:

periodically executing on a low priority basis a timestamp task of saving the value of the current time;

receiving at least two copies of each message from a remote station; and executing on a high priority basis for each received message, an input task comprised of the steps of identifying the received message as an acknowledgement message or a data message; comparing the value of the current time to the saved value; and ignoring the received message if it is identified as a data message and the difference between the value of the current time and the saved value is greater than a predetermined amount.

8. The method according to claim 7, wherein said ignoring step of said input task further includes the step of processing the received message if it is identified as an acknowledgement message.

9. The method according to claim 7, wherein said ignoring step of said input task further includes the step of processing the received message if it is identified as a data message and the difference between the value of the current time and the saved value is not greater than the predetermined amount.

10. A method of controlling messages applied by remote stations to multi-tasking data processing means, the messages including first type messages which are not re-asserted and second type messages which are re-asserted until acknowledged by the data processing means, said data processing means including means for generating the current time and at least two receiving means each receiving a copy of the messages from a remote station, said method comprising the steps of:

periodically executing on a low priority basis a timestamp task of saving the value of the current time;

receiving at least two copies of each message from a remote station; and executing on a high priority basis for each received message, an input task comprised of the steps of identifying the received message as a first type message or a second type message; accepting the received message if it is identified as a first type message; and for each received message identified as a second type message, comparing the value of the current time to the saved value, ignoring the received message if the difference between the value of the current time and the saved value is greater than a predetermined amount, and accepting the received message if the difference between the value of the current time and the saved value is not greater than the predetermined amount.

11. A method of controlling messages applied by remote stations to multi-tasking communications control means of a data communications systems, the messages being originated by a plurality of remote stations and including acknowledgement messages which are not re-asserted and data messages which are reasserted by the remote stations until aknowledged by the communications control means, said communications control means including means for generating the current time and at least two receiving means each receiving a copy of the messages from a remote station, said method comprising the steps of:

periodically executing on a low priority basis a timestamp task of saving the value of the current time;

receiving at least two copies of each message from a remote station; and executing on a high priority basis for each received message, an input task comprised of the steps of: identifying the received message as an acknowledgement messssage or a data message; accepting the received message if it is identified as an acknowledgement message; and for each received message identified as a data message, comparing the value of the current time to the saved value; ignoring the received message if the difference between the value of the current time and the saved value is geater than a predetermined amount; and accepting the received message if the difference between the value of the current time and the saved value is not greater than the predetermined amount.

12. A method of controlling messages transmitted by data radios to multi-tasking communications control means of a data communications system, said communications control means coupled to a plurality of base radios for receiving via a radio channel copies of each message transmitted by a data radio, the messages including acknowledgement messages which are not re-asserted and data messages which are reasserted by the data radios until acknowledged by the communications control means, said communications control means further including means for generating the current time, said method comprising the steps of:

periodically executing on a low priority basis a timestamp task of saving the value of the current time;

receiving at least two copies of each message from a remote station; and executing on a high priority basis for each received message, an input task comprised of the steps of: identifying the received message as an acknowledgement message or data message; accepting the received message if it is identified as an acknowledgement message; and for each received message identified as a data message, comparing the value of the current time to the saved value, ignoring the received message if the difference between the value of the current time and the saved value is greater than a predetermined amount; and accepting the received message if the difference between the value of the current time and the saved value is not greater than the predetermined amount.

* * * * *

UNITED STATES PATENT AND TRADEMARK OFFICE
CERTIFICATE OF CORRECTION

PATENT NO. : 4,714,923

DATED : December 22, 1987

INVENTOR(S) : C. R. V. Tassle

It is certified that error appears in the above-identified patent and that said Letters Patent is hereby corrected as shown below:

Column 14, line 48 delete the word "messasge" and insert --message--.

Column 15, line 29, change the word "comunications" and insert --communications--.

Column 16, line 28, change the word "aknowledged" to --acknowledged--.

Column 16, line 41, change the word "messsage" to --message--.

Signed and Sealed this

Fifth Day of July, 1988

*Attest:*

DONALD J. QUIGG

*Attesting Officer*   *Commissioner of Patents and Trademarks*